(12) United States Patent
Boehm et al.

(10) Patent No.: US 6,457,170 B1
(45) Date of Patent: Sep. 24, 2002

(54) SOFTWARE SYSTEM BUILD METHOD AND APPARATUS THAT SUPPORTS MULTIPLE USERS IN A SOFTWARE DEVELOPMENT ENVIRONMENT

(75) Inventors: Fritz A. Boehm, Drippings Springs; Jean Anne Booth, Austin, both of TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/373,840

(22) Filed: Aug. 13, 1999

(51) Int. Cl.[7] ................................................. G06F 9/44
(52) U.S. Cl. ....................... 717/106; 717/107; 717/120; 717/122
(58) Field of Search ......................... 717/3, 1, 11, 120, 717/122, 100, 101, 106, 107; 707/203, 101

(56) References Cited

U.S. PATENT DOCUMENTS

| | | | |
|---|---|---|---|
| 4,558,413 A | | 12/1985 | Schmidt et al. |
| 4,809,170 A | | 2/1989 | Leblanq et al. |
| 5,339,435 A | * | 8/1994 | Lubkin et al. ................. 717/11 |
| 5,574,898 A | * | 11/1996 | Leblang et al. ................. 707/1 |
| 5,615,400 A | * | 3/1997 | Cowsar et al. ............... 709/332 |
| 5,649,200 A | * | 7/1997 | Leblang et al. ................. 717/3 |
| 5,675,802 A | * | 10/1997 | Allen et al. .................... 717/33 |
| 5,748,961 A | * | 5/1998 | Hanna et al. ............... 717/145 |
| 5,787,280 A | | 7/1998 | Joseph et al. |
| 5,805,889 A | | 9/1998 | Van De Vanter |
| 5,850,554 A | | 12/1998 | Carver |
| 5,862,386 A | | 1/1999 | Joseph et al. |
| 5,905,990 A | * | 5/1999 | Inglett ......................... 707/200 |
| 5,978,805 A | * | 11/1999 | Carson .......................... 707/10 |
| 6,145,056 A | * | 7/2000 | Heydon et al. ............. 711/129 |
| 6,256,774 B1 | | 7/2001 | O'Leary et al. |

OTHER PUBLICATIONS

Title: Emosy: An SNMP Protocol Object Generator for the Protocol Independent MIB, author: Wu et al, source: IEEE, 1994.*

Title: Computer Aided Software Engineering in a Distributed Workstations Environment, Author: Leblang et al, ACM, Apr. 1984.*

U.S. Patent Application, "Method and Apparatus for Object Cache Registration and Maintenance in a Networked Software Development Environment," Inventors: Boehm, et al., Ser. No. 09/374,588, filed Aug. 13, 1999.

Aull et al.—"Validation Using CASE Tools", IEEE pp. 389–394, May 1992.

Heitmeyer et al.—"Engineering CASE Tools to Support Formal Methods for Real–Time Software Development", IEEE, pp. 110–113, Jul. 1992.

Beizer—"Software Testing Techniques", Van Nostrand Reinhold Company, Chapter 1—Introduction, pp. 1–14, 1983.

* cited by examiner

Primary Examiner—Gregory Morse
Assistant Examiner—Chameli C. Das
(74) Attorney, Agent, or Firm—Booth & Wright, LLP; Matthew J. Booth; Karon S. Wright

(57) ABSTRACT

The present invention is a method and apparatus for building a software system in a networked software development environment, utilizing existing software version control and build tools such as RCS and MAKE. Source and object files are loaded into network caches shared by multiple users at local workstations. At individual workstations, a cache link structure generated from a user-created build list is provided to the software building program, which then builds the desired software system using links to cached files. The present invention thus minimizes the amount of computing resources required to build software programs by eliminating the need to store multiple local copies of building block software files, and to rebuild object files that may be unchanged from prior builds. A method for maintaining and updating network caches to maximize the efficiency of cache link creation is also disclosed.

9 Claims, 10 Drawing Sheets

SOFTWARE SYSTEM BUILD METHOD AND APPARATUS THAT SUPPORTS MULTIPLE USERS IN A SOFTWARE DEVELOPMENT ENVIRONMENT

BACKGROUND OF THE INVENTION

1. Field of the invention

The present invention relates to Computer Aided Software Engineering (CASE) environments, and more specifically, to the use of software development and configuration management tools in a development environment that supports multiple concurrent users and simultaneous use of various versions of software configuration items by caching source and object code items.

2. Description of Related Art

In the last decade, the use of a Computer Aided Software Engineering (CASE) environment as a software development tool has evolved from being merely helpful to nearly essential, particularly for large or complex software systems. An effective CASE environment enables companies to exercise configuration management and version control over their software products, from the individual item level through the system level. Additionally, an effective CASE environment simplifies and supports efficient software design, by providing a library or storehouse of previously developed software items and modules that can be re-used, modified, expanded, or reconfigured as required to support development of upgrades, new applications, or new systems. The most useful CASE tools are capable of selecting identified items and modules, inserting required modifications, adding new items, and building software systems, all according to a software developer's instructions. Well-known CASE systems that execute these functions include UNIX/PWB, which includes the SCCS source code control system and the MAKE configuration tool; RCS; and CMS and MMS, which are essentially the VAX/VMS equivalent of SCCS and MAKE.

While these systems are powerful development tools, they also have inherent limitations that create problems, particularly when the company's software configuration library and the CASE system is shared by a group of designers over the company's internal network. To facilitate the design process, companies typically want their software developers to have ready access to the proper development tools, software library, and indeed, each others' files. However, when multiple users working at different workstations on the company's network simultaneously select files, add modifications, and build systems, the company's computing resources may be stretched beyond their limit. This is particularly a problem if multiple users' simultaneous system builds require computation-intensive recompilation and linking.

A related problem that arises in the development environment described above occurs when multiple users try to access the same item from the library. Some of the CASE systems described above also function as "gatekeepers" to the company's software library—they preclude two different designers from making changes simultaneously to a single library item, or they prohibit access and/or changes to "old" versions of a library item. While this "gatekeeping" feature is useful from a configuration management standpoint, it limits design flexibility in many current CASE systems.

To overcome the above limitations in networked development environment, software designers working on a single system (or potentially overlapping portions of a single system) have typically worked with a local copy of the entire system and local copies of all incorporated library source and object code items—including items required for periodic rebuilding, even if those items are not actively being worked on. As the number of users grows, the number of files duplicated across all the designers' workstations grows. This duplication wastes computing resources, storage space, and designers' time because it slows down the entire development environment. Also, when the networked system is tasked with two or more parallel local builds, the vast majority of each designer's local object files may be bitwise identical to other designers' local object files, if the designers are working on the same system or have made only minor changes to a small number of local source files.

These problems with current CASE systems demonstrate the need for a software development system that is optimized for multiple simultaneous users in a networked development environment. Moreover, in an optimal software development system, gatekeeping functions would not limit design flexibility to the extent that designers feel forced to create, maintain, and periodically re-build their own local, nearly-identical systems. The present invention is a CASE system and design environment that overcomes the above limitations of current CASE systems. In the present invention, source and object files are cached, registered, and shared by multiple designers working at multiple workstations, thus avoiding needless and resource-intensive replication and storage of common, shared files into redundant identical local files. This sharing of common files eliminates wasted space and computing resources associated with duplicative local files, avoids needless simultaneous local recompiling and rebuilding, and reduces system inefficiencies.

SUMMARY

The present invention is a method and apparatus for building a software system, preferably in a software development environment comprising networked software development computer workstations wherein multiple workstations have access to one or more network caches. The present invention works with currently available software configuration control and building programs, such as RCS and MAKE.

A practitioner of the present invention lists each source file (by name and version number) and each explicit object file (by name) that comprise the software system to be built, and from that build list, the present invention generates a cache link structure. The cache link structure is a system of source file links, and, to the maximum extent possible, object file links, preferably constructed in a directory tree that the present invention is capable of generating. Source file links associate source file names and versions listed on the build list to a copy of the corresponding source file stored in the network cache memory. Object file links are links from explicit object file names and potentially usable object file names to corresponding copies of the object file stored in a network cache memory. Explicit object file names are object files expressly named on the build list. Potentially usable object file names are file names generated by the present invention during the process of creating source file links. The present invention provides the cache link structure to a software building program such as MAKE. To the extent that files need to be reconstructed because of changes, MAKE then builds the software system using the links to the cached copies of the constituent files.

The present invention utilizes a source and object file naming convention and identification scheme to facilitate file identification and searching the network caches and creating the links to cached source and object files. Source files are cached under their filenames and version numbers. Object files are cached under their filenames, along with a random string of characters, which allows multiple versions of the same basic object file to simultaneously exist in the cache. Object files also contain an embedded character string that identifies all source files, along with their version numbers, that were used to generate the object file.

When searching the cache to locate the proper version of an object file to create a link to, the present invention examines object files with the same basic name as the target object file, in age-order (most recently created or accessed first). When the present invention locates a cached object file with the same basic name as the target object file that also contains an internal embedded identification string that identifies only constituent source files and versions that are also listed on the build list, the present invention creates a link to that object file.

To facilitate searching the cache for object files, the present invention supports the creation and caching of identification files. Each identification file corresponds to a specific object file in the cache, but contains only the embedded identification string from its corresponding object file. The name of each identification file is identical to its corresponding cached object file, except that an additional file extension that identifies the file as an identification file is appended to the identification file name. The use of the identification file enables quicker searching for object files during the linking process of the present invention.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

Figure 1:
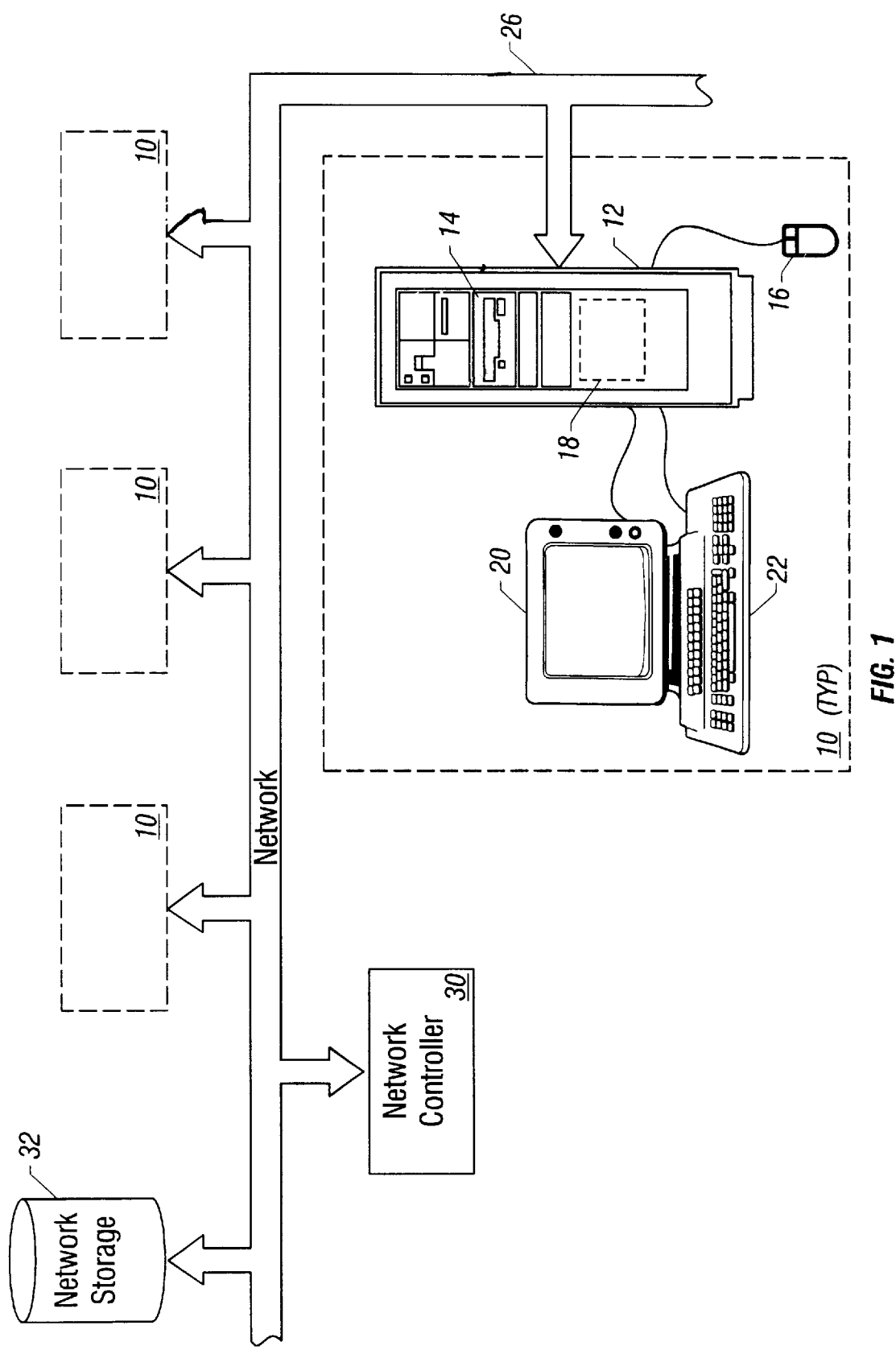
FIG. 1 shows a standard simulation workstation suitable for practicing the present invention.

The present invention is a method and apparatus for building a software system, preferably in a software development environment comprising networked software development computer workstations wherein multiple workstations have access to one or more network caches. The present invention works with currently available software configuration control and building programs, such as RCS and MAKE.

A practitioner of the present invention lists each source file (by name and version number) and each explicit object file (by name) that comprise the software system to be built, and from that build list, the present invention generates a cache link structure. The cache link structure is a system of source file links, and, to the maximum extent possible, object file links, preferably constructed in a directory tree that the present invention is capable of generating. Source file links associate source file names and versions listed on the build list to a copy of the corresponding source file stored in the network cache memory. Object file links are links from explicit object file names and potentially usable object file names to corresponding copies of the object file stored in cache. Explicit object file names are object files expressly named on the build list. Potentially usable object file names are file names generated by the present invention during the process of creating source file links. The present invention provides the cache link structure to a software building program such as MAKE. To the extent that files need to be reconstructed because of changes, MAKE then builds the software system using the links to the cached copies of the constituent files.

The present invention utilizes a source and object file naming convention and identification scheme to facilitate file identification and searching the network caches and creating the links to cached source and object files. Source files are cached under their filenames and version numbers. Object files are cached under their filenames, along with a random string of characters, which allows multiple versions of the same basic object file to simultaneously exist in the cache. Object files also contain an embedded character string that identifies all source files, along with their version numbers, that were used to generate the object file.

When searching the cache to locate the proper version of an object file to create a link to, the present invention examines object files with the same basic name as the target object file, in age order (most recently created first). When the present invention locates a cached object file with the same basic name as the target object file that also contains an internal embedded identification string that identifies only constituent source files and versions that are also listed on the build list, the present invention creates a link to that object file.

To facilitate searching the cache for object files, the present invention supports the creation and caching of identification files. Each identification file corresponds to a specific object file in the cache, but contains only the embedded identification string from its corresponding object file. The name of each identification file is identical to its corresponding cached object file, except that an additional file extension that identifies the file as an identification file is appended to the identification file name. The use of the identification file enables quicker searching for object files during the linking process of the present invention.

Finally, the present invention provides a methodology for selectively or automatically registering and caching certain object files generated by MAKE or other program-building software in response to a software developer's build list. The present invention includes a methodology for maintaining object caches in such a manner as to assure that the object caches use limited cache resources efficiently and are up to date, thus maximizing the capability of the present invention to create a highly useful cache link structure.

This disclosure describes numerous details that include specific development environment implementations, software configuration items and structures, and software configuration management systems and techniques in order to provide a thorough understanding of the present invention. One skilled in the art will appreciate that one may practice the present invention without these specific details.

FIG. 1 shows a typical software development workstation 10 suitable for practicing the present invention. As shown in FIG. 1, the workstation 10 comprises a monitor 20 and keyboard 22, a computer processing unit 12, and various peripheral interface devices that might include a floppy drive 14 and a mouse 16. Workstation 10 further includes memory 18 that further includes internal local cache memory (not shown in FIG. 1), and a network interface 26 that interfaces the workstation to a number of other workstations, external storage 32, and other external computing resources.

Although the present invention can be practiced on a standalone workstation that is not networked to other computer workstations or to other network components, the capabilities of the present invention are best realized in a software development environment that comprises a number of software development computer workstations 10 networked to a central network controller 30 and a storage medium 32 that includes a certain amount of quickly accessible electronic storage, such as random access memory (RAM), as shown in FIG. 1. The central network controller 30 and storage medium 32 includes a file server, a software library archive that is managed by a software configuration control system such as RCS, and one or more network cache memories that can be quickly accessed by all workstations on the network. For the purposes of this disclosure, cache memory that is internal to each local workstation on the network is referred to as "local cache memory" or "local cache." The term "network cache memory" or "network cache" refers to the electronic memory 32 located on the network that is quickly accessible by each local workstation on the network. In this disclosure, the present invention is described as being practiced in this development environment.

Notwithstanding the above description of the software development environment, one skilled in the art will recognize that the present invention can be practiced upon any of the well known specific physical configurations of standalone or networked software development workstations, using any of the well known software configuration management systems wherein software items are archived and maintained under a configuration or version control system.

Figure 2:
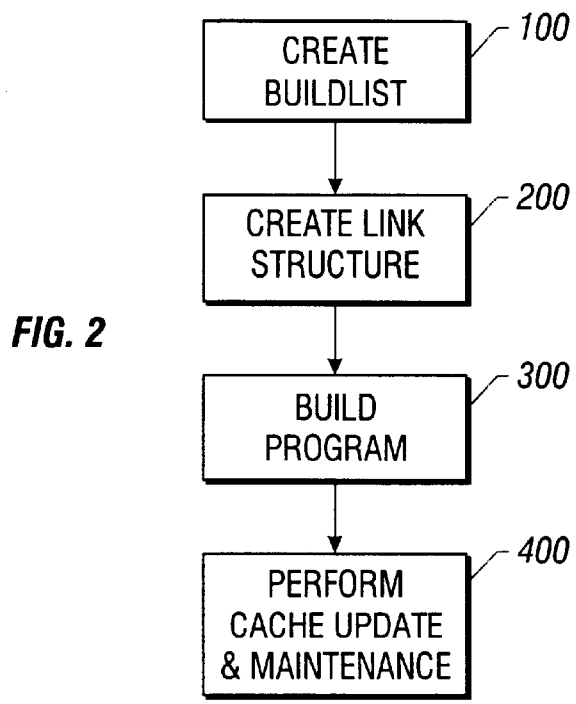
FIG. 2 is a high-level flow diagram that shows the major steps of the present invention.

FIG. 2 is a high-level flow diagram that shows the major steps of the present invention. As shown in FIG. 2, the method of building a software system using cacheable items principally includes a build list creation step 100, a network cache load and link step 200, a build program step 300, and a network cache maintenance and update step 400. FIGS. 3–9 and the accompanying text disclose how each major element of the present invention is accomplished. These figures and the accompanying text demonstrate how the present invention minimizes the use of computing resources and developer time while transforming a build list into a software system comprising one or more executable software program files.

As discussed in more detail below, a primary object of the present invention is to minimize computation time and resources utilized during software development and particularly, when building software systems during development. This is accomplished by pre-loading one or more network cache memories with as much useful information as can be ascertained from the build list and then creating a series of links at the local workstation level to that useful information in the network caches. Working with user-unique local links, rather than local copies of entire files, allows multiple users to share frequently-accessed building-block type files, and eliminates the need to download and then manipulate duplicate files. Additionally, caching as much useful information as possible, including compiled and other object files, potentially allows the software build program to avoid needless and time-consuming recompilation of commonly-used files.

The build program, described herein as the well-known program MAKE, but potentially any software build program, builds the software system by using the cached source and, to the maximum extent possible, cached object files identified by the links created in the cache load and link step 200. The presence of the files in one or more shared network caches, along with the directory structure and links created in step 200, allows MAKE to skip resource-intensive steps like checking out archive copies, making local copies, and recompiling and re-linking potentially unchanged object files. (In the context of this disclosure, the term "source file" is intended to mean any file directly archived into a version control system such as RCS, and generally, refers to files written in a higher-order programming language, such as ANSI "C," that must be translated or compiled before execution by a computer. The term "object file" is intended to mean a file that has been created by running some sort of operation on one or more source files, such as compiling them or running a lexical analyzer on them.)

One key to the present invention is the capability of RCS and other software version control and archive systems to utilize an identification string embedded into source files by the creator of the source file. For example, when the RCS version control system encounters the marker "$Id$" in a source file, it replaces the marker with an expanded identification string of the form $Id: filename revision date time author state $ Practitioners of the present invention propagate a source file's expanded identification string into every object file created from the source file by placing the marker in a literal character string within the source file. For example, for RCS source files written in C, the source file author can include within the source file the following character string:

static char rcsid[ ]="$Id$"

The RCS system expands the marker when it encounters the $Id$ string, and the entire expanded static character string then becomes part of the source file that propagates into every object file that the source file is a constituent of. The present invention depends upon this propagation protocol to identify object files for caching and for creating links to cached object files. As explained in more detail below, the present invention utilizes the embedded strings within object files as a pedigree of sorts—a unique code that both identifies an object file and fully documents its constituent source files by name and version number.

The present invention also allows users to manipulate and maintain the network caches outside the build process, thus insuring that the network caches are as up-to-date and useful as possible. While the cache and network update step 400 is shown in FIG. 2 as logically occurring after building a program, network cache updates and maintenance can be performed at any time, as described in more detail below.

Figure 3:
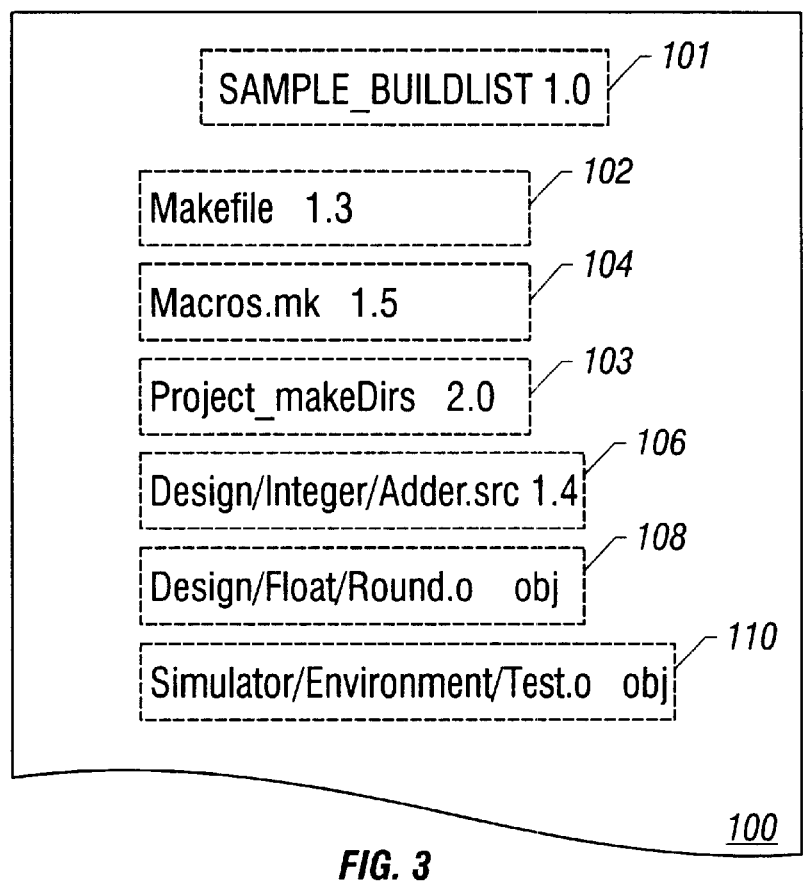
FIG. 3 shows the build list according to a preferred embodiment of the present invention.

FIG. 3 shows how a build list 100 is created according to a preferred embodiment of the present invention. As shown in FIG. 3, build list 100 has a name and version number 101, and includes a list of file names 102, 103, 104, 106, 108, and 110. In this example, and for illustrative purposes only, assume that "Sample_Build list 1.0" is a build list that creates a software system called "Sample_System" version 1.0, using the files shown on the build list 100.

In build list 100, file names 102, 103, 104, and 106 are source files. The present invention requires source files designated in a build list to have both a file name and a version number. Consequently, two source files that have the same basic file name but different version numbers are not the same source file. The build list entries designated as 102, 103, 104, and 106 in build list 100 are source files "Makefile 1.3," "Project_makeDirs 2.0," "Macros.mk 1.5," and "Adder.src 1.4," respectively.

Build list 100 also includes explicit object files "Round.o obj," included in build list entry 108 in FIG. 3, and "Test.o obj," included in build list entry 110 in FIG. 3. In this disclosure, object files explicitly listed on a build list are called "explicit object files." As described in further detail below, the present invention also generates object file names during the cache load and link step 200. These generated object files are designated herein as "potentially usable object files." The presence of explicit object file names on build list 100 indicates that Sample_System must include the object files Round.o and Test.o.

As described above, build list entries 106, 108, and 110 reflect that certain source and explicit object files are constituents of Sample_System. However, in a preferred embodiment of the present invention, as shown in FIG. 3, these entries also convey that Sample_System has an internal directory structure, and that during construction of Sample_System, certain files listed on build list 100 must be placed into certain directory locations. In the example build list shown in FIG. 3, the proper location and path for Adder.src, shown in entry 106, is in subdirectory Integer, which is a subdirectory of directory Design. Likewise, the object file Round.o, shown in build list entry 108, is to be located in subdirectory Float of directory Design. Finally, build list 100 indicates that Test.o is located in directory Simulator, subdirectory Environment.

Figure 4:
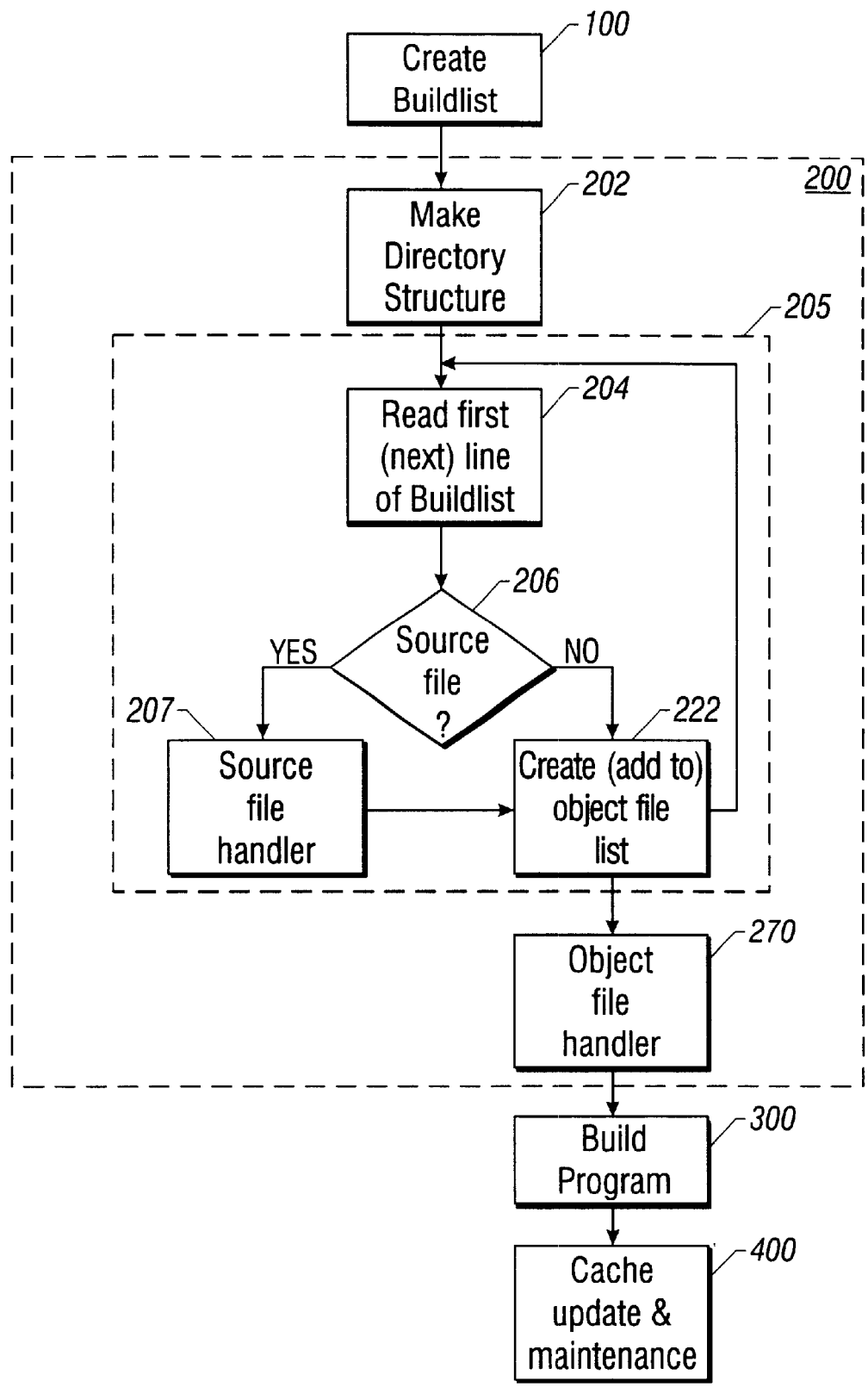
FIG. 4 is a logic flow diagram that shows the cache load and link process that comprises a portion of the present invention.
Figure 5:
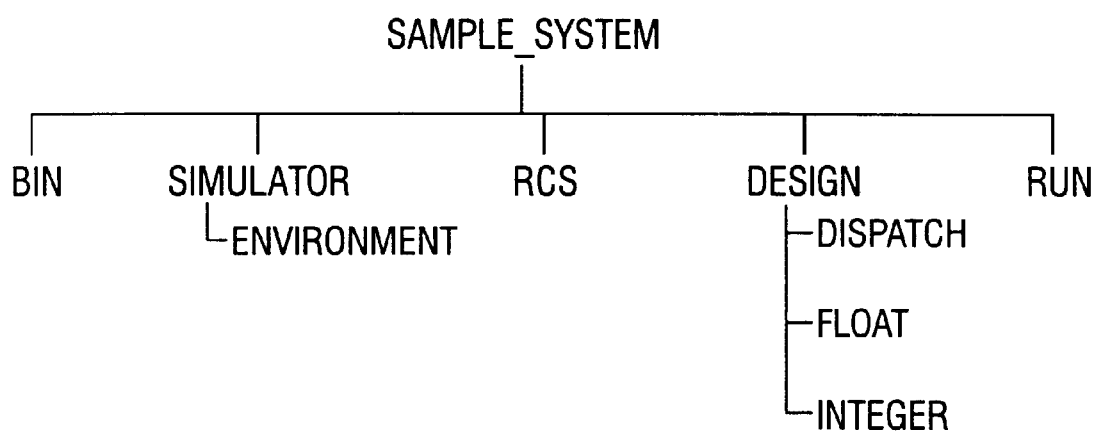
FIG. 5 illustrates the directory structure that the preferred embodiment of the present invention will create from the FIG. 3 build list.

FIG. 4 is a logic flow diagram that provides further detail and insight into the cache load and link process that comprises step 200 of the present invention. Referring to FIG. 4, after build list 100 is created according to the conventions shown and described in FIG. 3 and in the accompanying text, the build list is provided to the workstation at 202 and the present invention constructs a directory structure and links from the build list 100 to the appropriate files in the network caches. In a preferred embodiment, the directory structure to be constructed is defined by the user, via a source file that is included on the build list. In the sample build list shown in FIG. 3, source file "Project_makeDirs 2.0" (build list entry 103) is a source file that makes the directory structure shown in FIG. 5.

The creation and execution of a make directory script is well known in the art, and thus further detail regarding the creation of a directory structure is not provided here. One skilled in the art will recognize that a practitioner of the present invention can design the make directory step 202 of the present invention to implement a default or predefined directory structure, eliminating the need for the developer to include a make directory script on the build list. Alternatively, practitioners of the present invention may elect to skip step 202 altogether, and build their links and software system without any associated directory structure at all. Finally, the directory creation step of the present invention can be practiced by executing either a specific source file script (as in the preferred embodiment) or a default structure, plus allowing for additional structure to be created "on the fly" as the build list is read, if a build list entry includes a directory path that is not specifically created by the build list make directory script or the default directory structure. Any of these directory creation options that meets the needs of the software developer and the program to be built can be implemented without departing from the present invention.

Referring back to FIG. 4, after the creation of the directory structure, the build list 100 is read, line by line. After a line is read at block 204, the present invention checks the file name at 206 to determine whether the file specified on the build list 100 is a source file or an explicit object file. As described above, the present invention requires source files to be specified as file names and version numbers. If, instead of a version number, a build list file name has the string "obj" associated with it, the present invention interprets that entry as calling for an object file rather than a source file.

If the filename on the build list line read is an object file, the present invention simply places that filename in an object file list (block 222) and, if there are more lines in the build list, returns to block 204 to read the next line of the build list.

If the filename on the build list line read is a source file, the present invention branches to the source file handler 207, described in more detail below. The source file handler 207 then adds potentially usable object files to the object file list at 222, and the present invention then returns to block 204 to read the next line of the build list 100. This loop, shown as 205 in FIG. 4, repeats until the entire build list 100 has been read and processed through the source file handler 207 and/or the object file list 222, at which time the present invention invokes the object file handler 230. After the object file handler processes the explicit object files listed on the build list 100 and the potentially usable object files generated by the source file handler (as described in more detail below), the program can be built using MAKE or another software-building program (shown as step 300 in FIG. 2).

Figure 6:
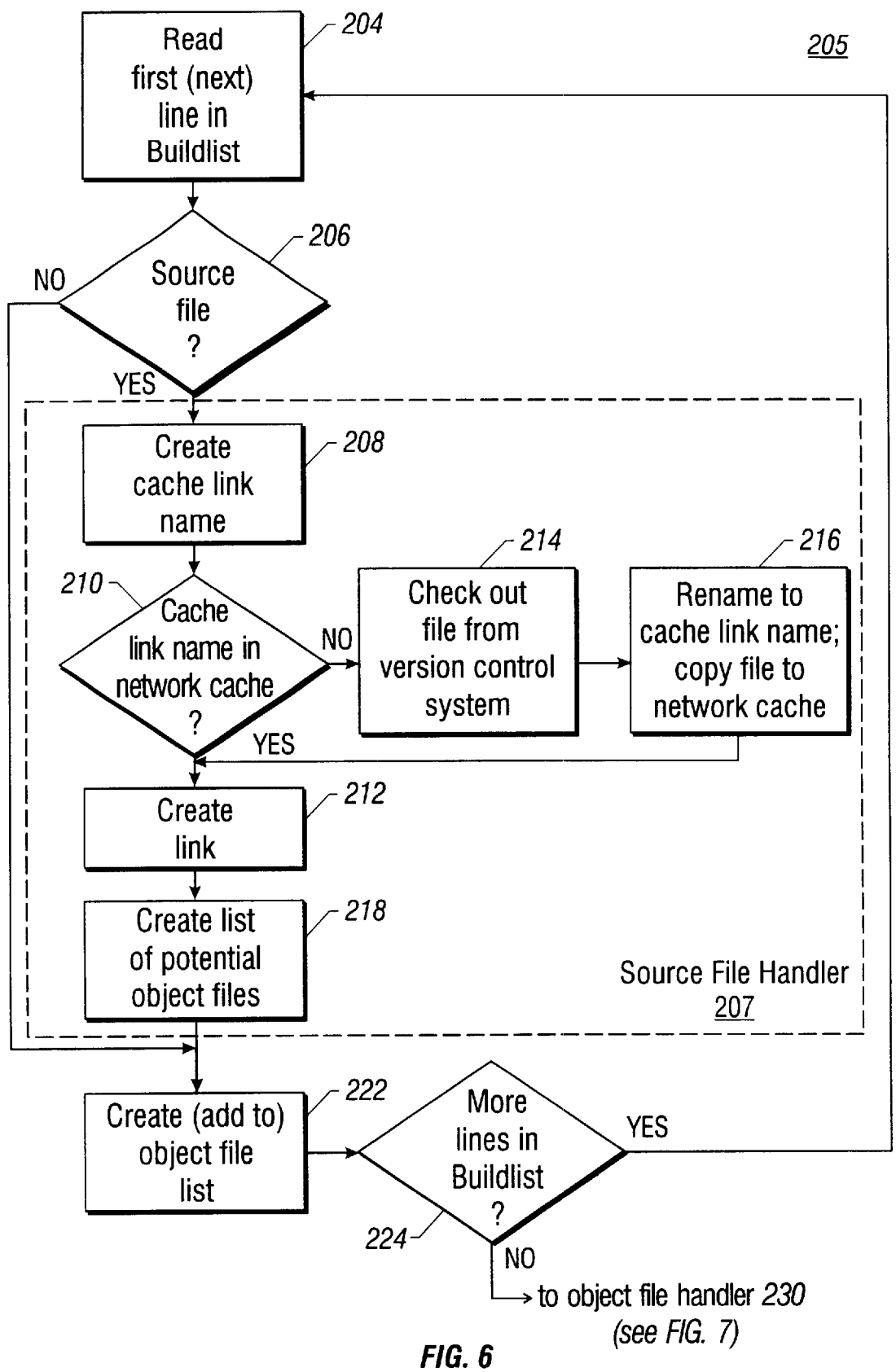
FIG. 6 is a logic flow diagram that illustrates the iterative build list read process and describes the functions of the source file handler, according to a preferred embodiment of the present invention.

FIG. 6 is a logic flow diagram that illustrates the iterative build list read process 205, and describes the functions of the source file handler 207. The build list read process 205 begins at 204 by reading the first line of the build list. As described above, the present invention checks at 206 to see if the build list line read calls for a source file or an explicit object file. If the file listed is an explicit object file, the present invention creates an object file list (the first time through the process) and adds the explicit object file to the object file list at block 222.

On the other hand, if the line read from the build list calls for a source file, the present invention continues to the source file handler 207.

The first task that the source file handler 207 performs is to create a cache link name (block 208) that preferably includes the file name and version number of the source file listed on the build list. For example, in the preferred embodiment, the cache link name that the present invention would create that is associated with version 1.4 of source file "Adder.src" would be "Adder.src_1_4." In this example, as in others described below where filenames are created for cache management purposes, the portion of the cache link name "Adder.src" is considered to be the basic file name. The characters "_1_4" are simply added for identification purposes. As described in further detail below, the present invention continues this basic file naming scheme throughout the various steps that include naming and renaming files for caching purposes.

Referring back to FIG. 6, the source file handler 207 next compares, at 210, the cache link name created at 208 with the file names of source files stored in the appropriate network caches. In a preferred embodiment, there will be a plurality of network caches, preferably segregated into at least one source file cache and a number of object file caches, one for each different host architecture upon which the software system to be built will run. However, the present invention can be practiced with a single network cache that holds source and object files, or alternatively, one or more local caches, if the present invention is being practiced on a standalone workstation.

At 212, if there is a copy of a source file stored in the source file cache that has the same file name as the cache link name created at 208, the source file handler 207 creates a link from the build list source file name to the cache link name and cache address of the proper source file, and places that link at the appropriate place in the user directory structure.

On the other hand, if the source file handler 207 does not find a file having the cache link name in the network source file cache at step 210, the source file handler 207 checks out a copy of the source file from the software library archive at 214, renames the file with the cache link name created at 208, and copies the renamed file into the proper network cache at 216. At this point, the source file is in the network source file cache, and the source file handler 207 can then create the link required at 212, as described above.

Before moving to the next line in the build list, the last task that the source file handler 207 performs for each source file listed on build list 100 is shown at block 218 of FIG. 6. The source file handler 207 creates a list of potentially usable object filenames that MAKE might create from each source file name, and adds those potentially usable object files to the object file list. Potentially usable object file names are created by applying a set of rules developed by the practitioner of the present invention that correspond to the development environment in which the practitioner is working. For example, a practitioner of the present invention that includes source files created in the "C" programming language on his build list might invoke the rule that when compiled using MAKE, C files ending with the file suffix .c, .C, .cxx, .cc, or .cpp may create an object file that ends with the file suffix .o. Similarly, Lex files ending with the suffix .1 may make both a .cc object file and a .o object file. By running a script that invokes these and other user-defined rules, the present invention generates these potentially usable object filenames and then adds them to the object file list at block 222.

The final step in loop 205 of the present invention is to check for unread lines on the build list at 224. If there are unread lines, loop 205 repeats until the entire build list has been read and processed. When there are no more unread lines on the build list, the present invention proceeds to the object file handler 230.

Those skilled in the art will understand that the first time through logic loop 205, the present invention creates the object file list at block 222, regardless of whether block 222 is reached via the decision block 206 or through the source file handler 207. The present invention then adds to the object file list upon each subsequent pass through logic loop 205, again, regardless of whether block 222 is reached after decision block 206 or after the source file handler 207. After every line in the build list 100 has been read, the final result of iterative loop 205 will be a series of links in a directory structure which point to source files stored in the network cache, and a single object file list that is essentially an inventory, in no particular order, of all explicit object files listed on the build list along with all potentially usable object files that might be created from all the source files listed on the build list. This object file list then becomes an input to the object file handler 230, illustrated in FIG. 7.

Figure 7A:
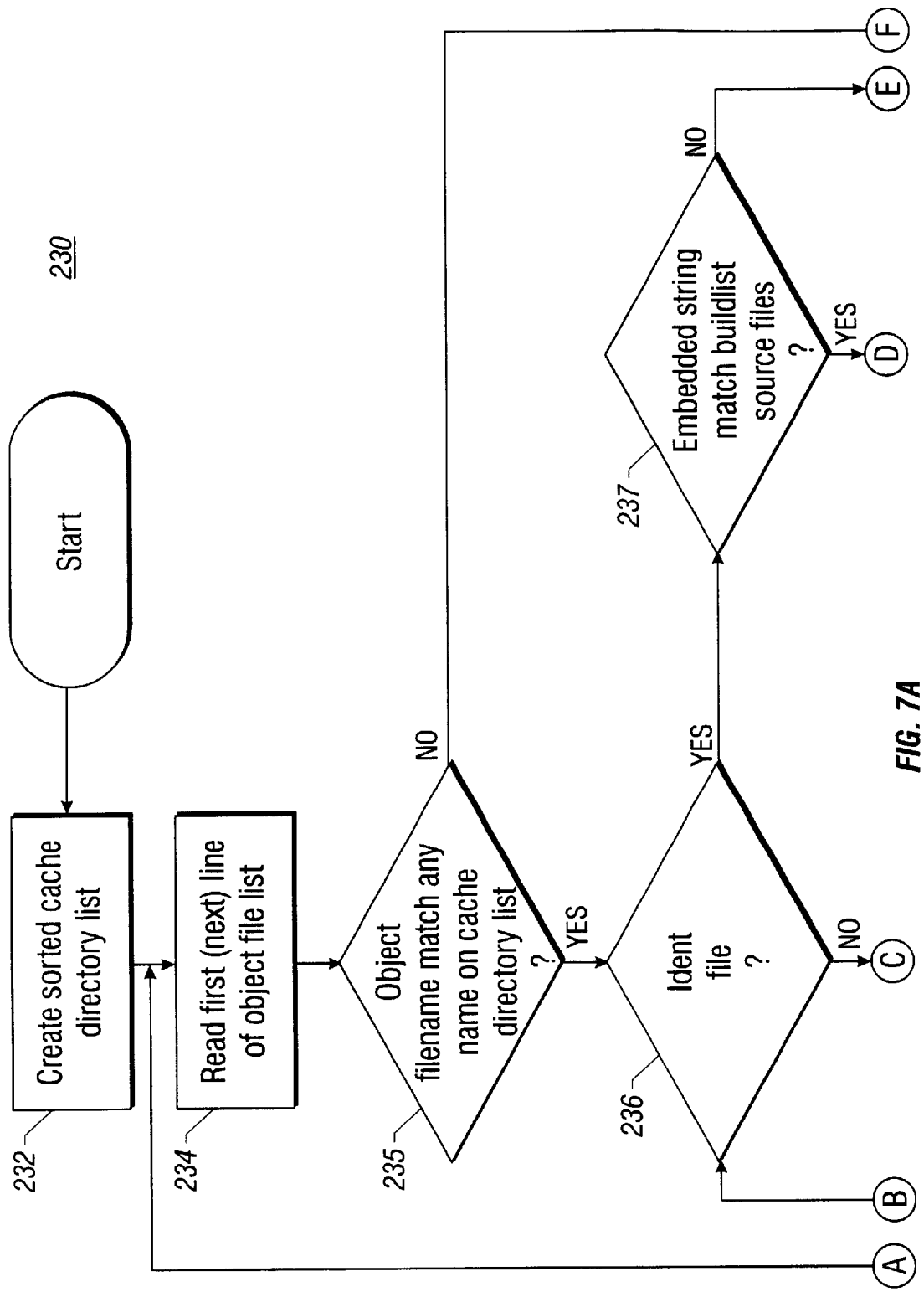
FIG. 7 is a logic flow diagram describing the function of the object file handler, according to a preferred embodiment of the present invention.
Figure 7B:
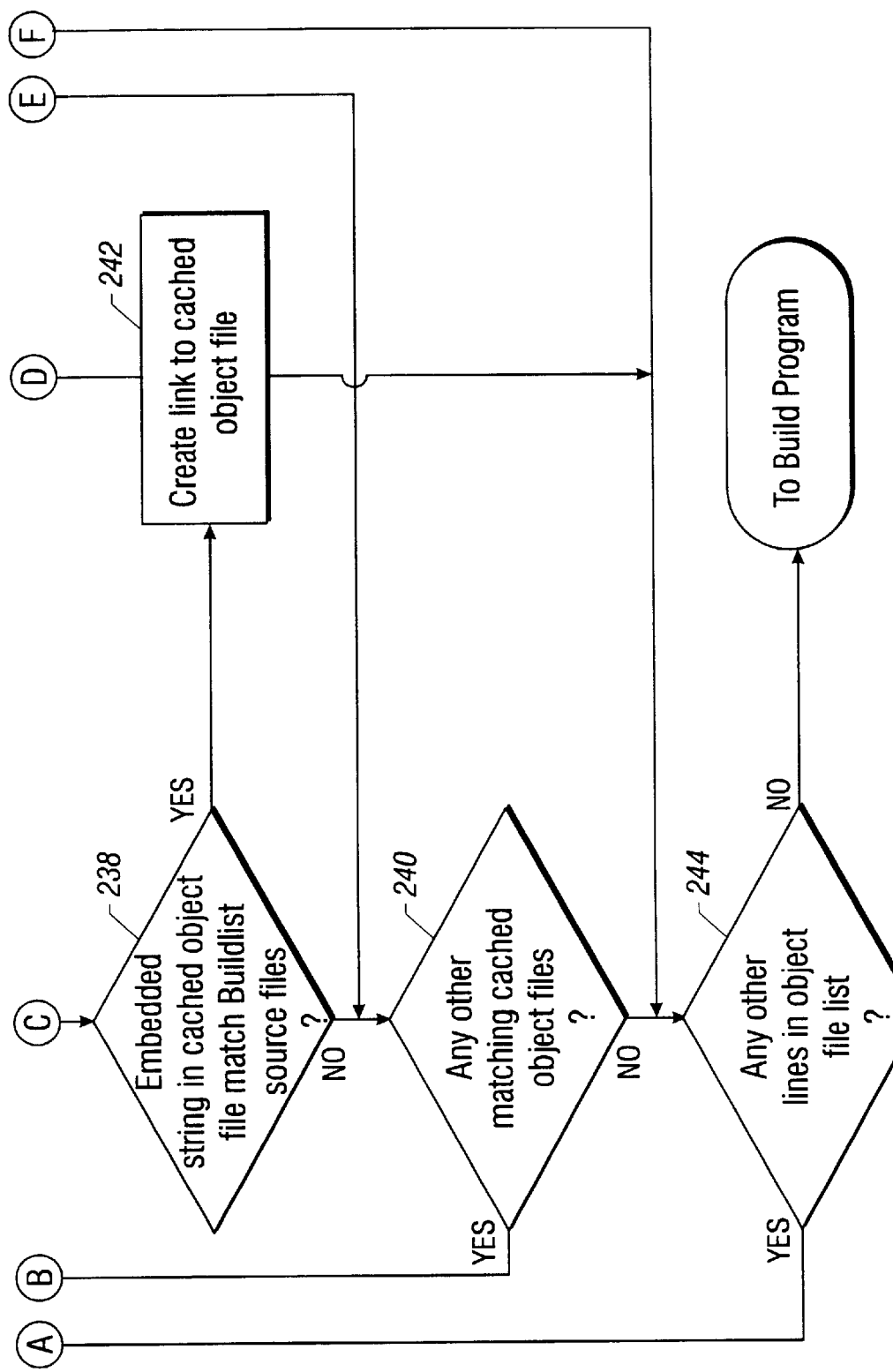

The object file handler's goal is to create as many useful links as possible to object files in the object file cache. Useful links are links to object files that may be useful in the build process. Referring to FIG. 7, the first task that the object file handler 230 performs, at 232, is to sort the names of the object files currently stored in the network object file caches to create a cached object file directory list. The object file handler 230 sorts the file names associated with the cached object files first alphabetically, and then by time stamp (most recently-created first). The object file handler 230 then reads, at 234, the first object file name from the object file list (note that this may be either an explicit object file, i.e., an object file listed expressly on the build list, or a potentially usable object file, i.e., an object file name generated from a source file name). At 235, the object file handler compares the object file name to the sorted cached object file directory list created at 232. Because the object file directory list contains the names of all cached object files in alphabetical order, most recently created first, if the object file handler finds one or more cached object files with names that match a name from the object file list (indicating that a useful link might potentially be created) it will always examine the most recent of those files first. This approach insures that when multiple copies of the same object file exist simultaneously in the object file cache, the link will always be created to the most-recently-created correct object file.

If the object file name from the object file list matches a cached object file name on the sorted directory list, the object file handler 230 checks, at 236, to see if there is an identification file that corresponds to the cached object file. As described in further detail below, identification files are files cached in the object file cache that have the same file name as a cached object file, except that an identification file name also includes an appended character string (e.g., ".id" or ".ident") that identifies the file as an identification file. Identification files contain only the embedded identification strings within the object file that corresponds to the identification file. Further detail regarding the creation and use of identification files is provided below, in connection with the object file cache maintenance discussion.

Returning to FIG. 7, if there is an identification file, the object file handler 230 examines it at 237 to determine the pedigree of its corresponding cached object file. If the embedded identification strings in the identification file identifies only constituent source files and version numbers that are also included on the build list 100, then the object file handler creates, at 242, a link to the cached object file that corresponds to the identification file. If there is not a perfect match; i.e., if the identification strings in the identification file indicate that the corresponding object file was derived in whole or in part from source files/versions that are not included on the build list 100, then the object file handler 230 looks for another matching cached object file name at 240.

If, on the other hand, there is not an identification file that corresponds to the cached object file whose name matches the name read from the object file list at 234, the object file handler 230 reads the embedded identification strings directly from the object file itself, as shown at 238. Again, if the embedded identification strings identify only constituent source files and version numbers that are also included on the build list 100, then the object file handler creates, at 242, a link to the cached object file. If there is not a perfect match; i.e., if the identification strings in the object file being examined indicate that it was derived in whole or in part from source files/versions that are not included on the build list 100, then the object file handler 230 looks for another matching cached object file name at 240.

As FIG. 7 suggests, the use of identification files is optional. The creation and use of identification files enables the object file handler to search for pedigree information more quickly, particularly in systems with very large or complex object files. Rather than searching an entire object file for its embedded strings, the use of an identification file that corresponds to an object file means that the object file handler needs only to locate the proper identification file and read the object file's embedded identification strings there. Practitioners of the present invention may choose to forgo the use of identification files, or alternatively, may use them only for large object files.

Returning to FIG. 7, where an embedded string examined in either an identification file or an object file identifies one or more constituent source files or versions of source files that are not listed on the build list, if there is another (older) matching cached object file name, the object file handler 230 repeats the examination of the embedded identification strings within either the identification file, or, if there is no identification file, within the older cached object file itself. This iterative embedded-string examination process continues until either an exact match is found (meaning that the embedded identification strings within either the identification file or within the cached object file identify only source files/versions that are also included on the build list 100), or the object file handler exhausts the list of cached object files whose names match the entry in the object file list read at block 234. In the former case, when the object file handler locates an exact match to the build list source files, the object file handler stops looking at matching cached object files, creates a link to the cached object file whose source files matched the build list (block 242), and then tests to see if there are additional unread lines in the object file list (decision block 244). In the latter case, when the object file handler 230 is unable to locate a cached object file whose constituent source files match the build list, no link is created and the object file handler 230 looks for another entry, at 244, on the object file list.

In the preferred embodiment, because the sort step at 232 sorts the cached object file names alphabetically and then in age order, matching files are always examined in age order, from newest (most-recently-generated) to oldest. If the object file handler 230 finds an exact match in the embedded identification strings, then the link that the object file handler 230 creates at 242 will be a link to the newest cached object file with the desired constituent source files. If the object file handler 230 creates a link at 242, that link is created at the directory location specified in the build list 100 (if the object file was an explicit object file) or the directory location identified for the source file (if the object file was a potentially usable object file generated from a source file name).

After the object file handler 230 either finds an exact match and creates a link to the matching cached object file, or examines and rejects every cached object file with a filename that matches a filename from the object file list, the object file handler checks to see if there are additional unread entries on the object file list at 244. If there are additional entries, the process repeats until all lines of the object file list have been read and either appropriate links to matching cached object files have been created, or all cached object files (or their corresponding identification files) with matching names have been examined and rejected.

The outcome of the present invention at this point in the process is therefore a directory structure that contains links to cached copies of every source file called out on the build list 100, and may contain links to zero, one, or more cached copies of object files that may be expressly called out on the build list or may be simply potentially usable by MAKE during the build process. Depending upon the makeup of the build list and the network caches, the directory structure may include links to none, some, or all of the explicit object files and potentially usable object files that are necessary for MAKE to build the system. An example of the directory structure and links that the present invention creates for the FIG. 3 sample build list is included in FIG. 8.

Figure 8A:
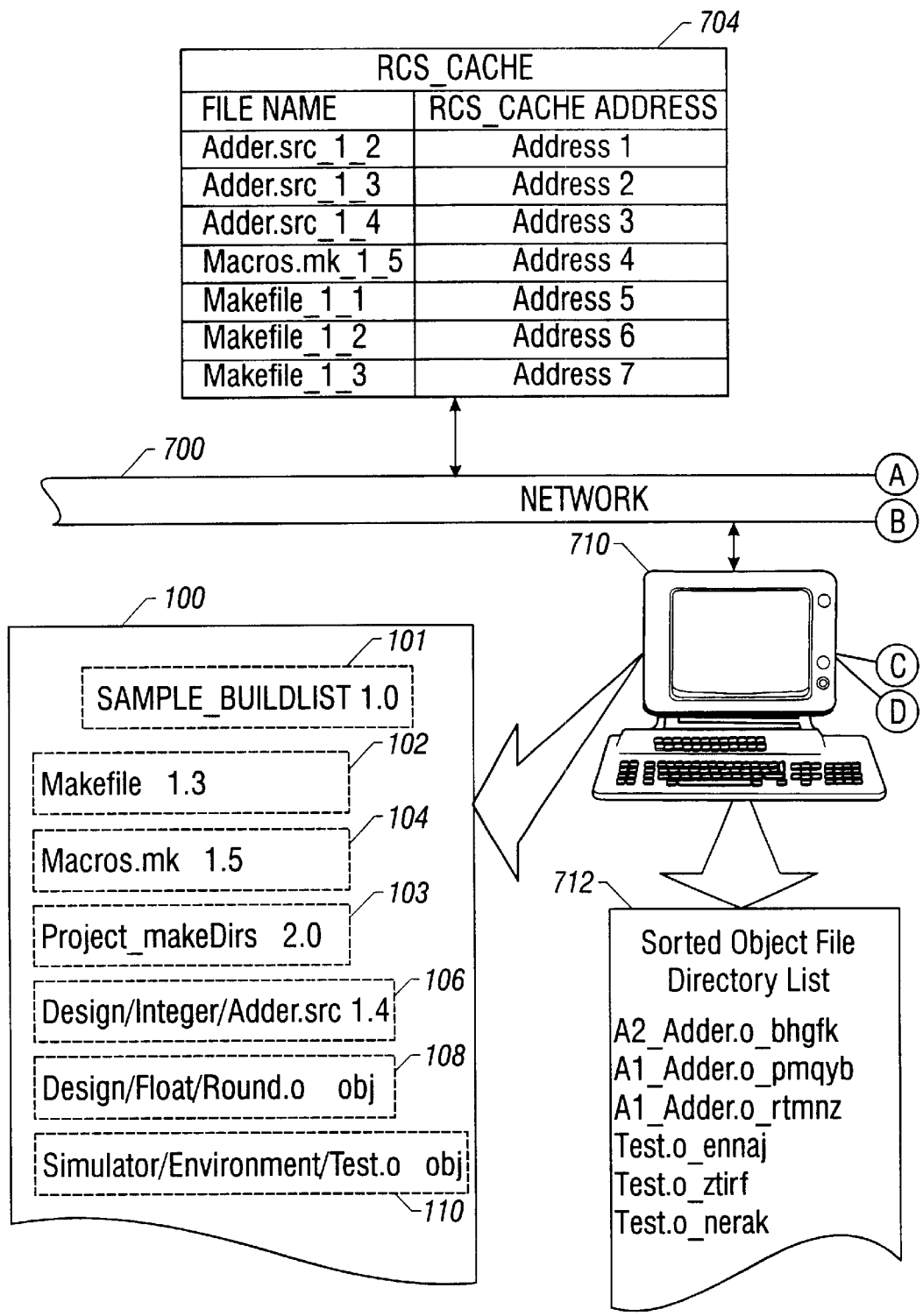
FIG. 8 depicts a sample link structure output of the cache load and link portion of the present invention in the context of an exemplary software development environment.
Figure 8B:
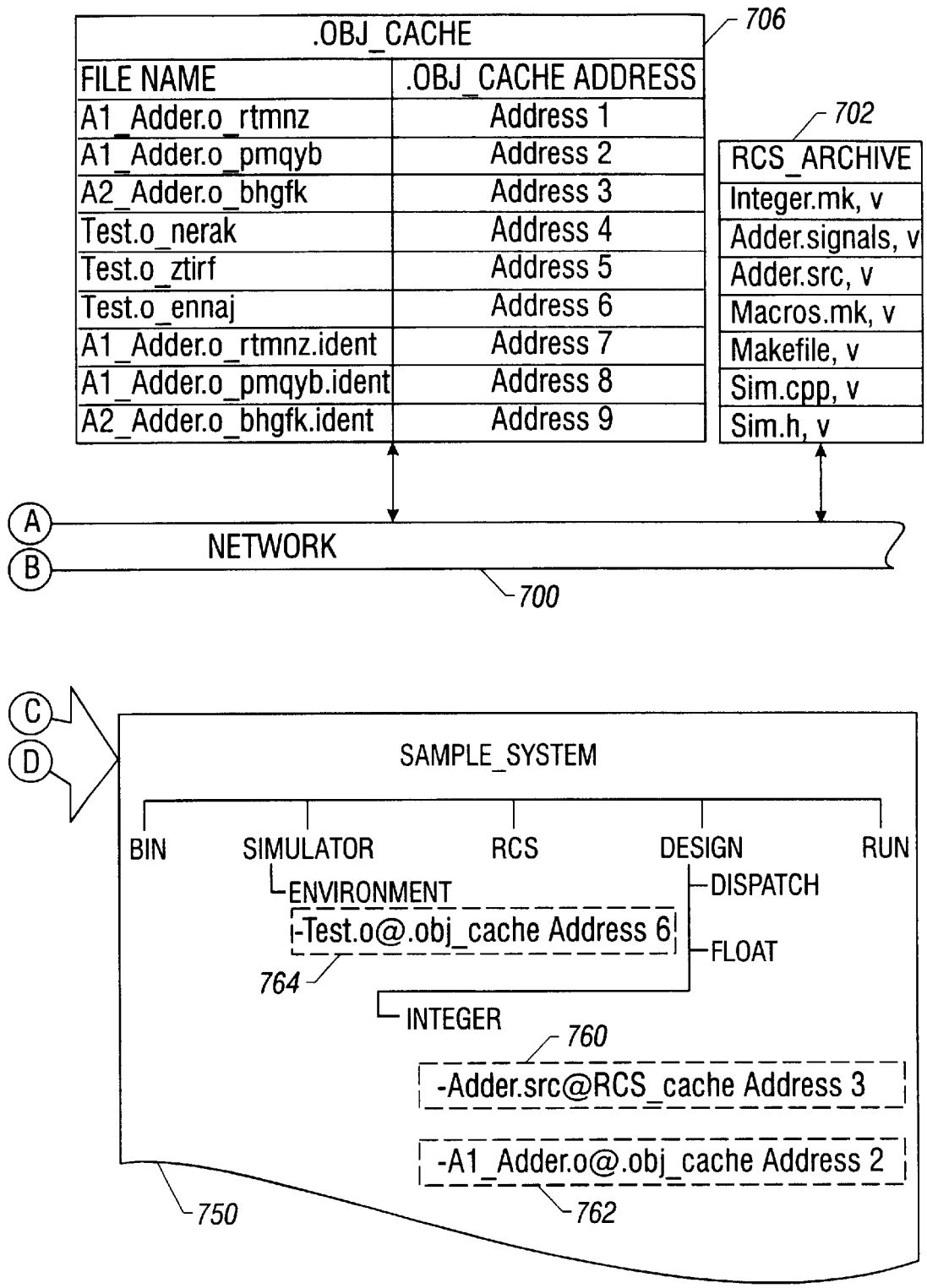

FIG. 8 depicts a sample link structure 750 that is the output of the cache load and link step 200, when the preferred embodiment of the present invention is practiced in a preferred software development environment. In FIG. 8, local software development workstation 710 is connected to a network 700, which provides workstation access to a network source file cache, RCS_cache, designated as 704, and a network object file cache, .obj_cache, designated as 706. As shown in FIG. 8, network source file cache RCS_cache is loaded with multiple versions of various source files, each with a unique file name within the cache directory. Similarly, network object file .obj_cache is loaded with multiple versions of various object files. Finally, network 700 also provides an interface to software archive RCS 702, which contains archive copies of various components of the software system and tools under RCS version control.

The cache link structure 750 shown in FIG. 8 is an example output produced by the present invention for sample build list 100, which is provided to the local workstation 710. Cache link structure 750 includes a directory structure created in block 202 of FIG. 4, which in this case, is produced according to a rule-based script developed by practitioners of the present invention. In this example, the build list 100 included source file "Project_makeDirs 2.0," build list entry 103. Project_makeDirs 2.0 is a source file that calls for a make directory script in which root directories "Bin," "Simulator," "Design," "RCS," and "Run" are created, along with subdirectories "Environment," "Dispatch," "Float," and "Integer." One skilled in the art will recognize that a practitioner of the present invention can create and run any make directory script to create a directory structure that meets the needs of the practitioner. Alternatively, as described above in connection with FIG. 4, the make directory step can be skipped altogether.

Cache link structure 750 includes the link "Adder.src@RCS_Cache Address 3," designated as 760 in FIG. 8. Link 760 was created by the source file handler 207 and corresponds to the source file "Adder.src" version 1.4 (build list entry 106 on FIG. 3). Because "Adder.src version 1.4" is listed on the build list 100 as being located in subdirectory Integer of root directory Design, that is where the present invention places link 760. In this example, the source file handler 207 created the cache link name "Adder.src_1_4," located the file named "Adder.src_14" in the network source file cache "RCS_cache" at location "Address 3," created link 760, and placed it in subdirectory Integer of root directory Design.

In this example, cache link structure 750 includes link 762, to object file "A1_Adder.o" at cache address 2 in the network object file cache 706. The present invention creates this link as follows: the source file handler 207 generates the potentially usable object filename "Adder.o" from the source file "Adder.src," (block 218 of FIG. 6) and adds the filename "Adder.o" to the object file list (block 222, FIG. 6). The object file handler 230 locates the files "A1_Adder.o_rtmnz," "A1_Adder.o_pmqyb," and "A2_Adder.o_bhgfk" in the network object file cache 706, reads the time stamp on the three files, and then creates a sorted object file directory list.

For this example, assume that the newest Adder.o object file is "A2_Adder.o_bhgfk," followed by "A1_Adder.o_pmqyb," and that "A1_Adder.o_rtmnz" is the oldest "Adder.o" object file. Similarly, assume that the "Test.o" object files listed in the .obj cache 706 in FIG. 8 are listed in oldest-to-newest order. Under these assumptions, the sorted object file directory list that the present invention would create for the .obj cache 706 is shown in FIG. 8, designated as 712. In other words, the object file handler has created a sorted file directory list 712 that contains the names of the six object files currently stored in .obj cache 706 in alphabetical order, newest to oldest. Note that the present invention includes only object file names on the sorted object file directory list 712. Identification files, although included in .obj_cache 706, are excluded from the sorted object file directory list 712.

Assume, for this example, that the newest object file "A2_Adder.o_bhgfk," includes a constituent source file that is not listed on build list 100. Therefore, both the object file "A2_Adder.o_bhgfk" and its corresponding identification file, "A2_Adder.o_bhgfk.ident" will contain an embedded string identifier that indicates the presence of a source file that is not included on build list 100. Under this assumption, for this example, the object file handler 230 does not create a link to "A2_Adder.o_bhgfk," but rather, moves on to examine "A1_Adder.o_pmqyb.ident," which is the identification file for the next-newest object file, "A1_Adder.o_pmqyb." As this example assumes that "A1_Adder.o_pmqyb" includes only source files and version numbers that are also listed on the build list, the embedded strings within "A1_Adder.o_pmqyb.ident" will identify only source files and version numbers listed on the build list, and object file handler 230 creates link 762, to "A1_Adder.o @ .obj_cache Address 2," and places that link in subdirectory Integer of root directory Design, because that is where the source file that generated the object file name was located.

In this example, link 764 is created by the object file handler 230 in a similar fashion. Note, however, that the object file handler 230 does not create a link to any object file named "Round.o," even though the object file "Round.o" is expressly listed on the build list. This is because the network object file cache 706 does not contain any file that includes the character string "Round.o" in its name, and therefore no link can be created.

After the cache load and link sequence is complete, the present invention provides the cache link structure 750 containing links to the appropriate cached source and object files to the program builder MAKE. MAKE then builds the software system, using the links created in step 200.

Those skilled in the art understand that MAKE, like many commonly available software building programs, constructs a software system comprising one or more executable software files by gathering source files, compiling them or otherwise modifing them according to an established set of rules comprising inherent rules plus user-selected rules, and assembling the final product(s). MAKE rules typically communicate file interdependencies, and instruct the MAKE program to take action depending upon the outcome of a dependency comparison. In MAKE, the outcome of dependency comparisons is a function of the time stamps on the files being compared. MAKE automatically assumes that if a file depends upon a newer file, the older file is obsolete and action needs to be taken during the build process to update the older file.

For example, a typical MAKE rule might appear as follows:

foo.o: foo.c
    g++ -c foo.c

This rule informs MAKE that foo.o depends upon foo.c. If foo.c is newer than foo.o, then MAKE is to run g++ on foo.c, thus creating a new foo.o. On the other hand, if foo.o is newer than foo.c, MAKE is to take no action.

In a typical software build, in the absence of the present invention, MAKE will generally look in specified limited locations for the files on either side of the colon in the first line of the rule, although there are exceptions. In a typical build that includes the above rule, MAKE would probably not locate the file foo.o, unless a copy of foo.o happened to be stored in the local memory of the workstation upon which the developer is running MAKE. MAKE might find a version of the file foo.c in a default location, or it might check out from the RCS archive a copy of the version of foo.c most recently archived (even if the most recently archived version of foo.c does not happen to be the version intended by the designer). MAKE would then compile whatever version of foo.c it found to create foo.o, as instructed by the rule.

The present invention works with the MAKE rules to transform MAKE's comparison of two or more time-stamped files into a comparison of two or more links to time-stamped cached files that are accessible to everyone on the network. For the present invention to work properly with MAKE, the time stamps on the links must be the same as the time stamps on the cached files to which the links point. Using the above rule, if foo.o is a link to a cached object file with a time stamp that is the same as the time stamp of the cached object file, and foo.c is a link to a cached source file with a time stamp that is the same as the time stamp of the cached source file, then MAKE will only recreate foo.o if the cached copy of foo.o is older than the source file foo.c. In other words, the present invention causes MAKE to skip, where possible, cumbersome file location/check out and recompilation steps. Similarly, because MAKE cannot generally find object files and must ordinarily recreate them, the present invention allows MAKE to find an object file link with a time stamp and then to make a meaningful comparison to determine whether any source file change may require a new object file to be created. Finally, because every instance of MAKE running on a workstation in a networked development environment is working with local links to network caches, the present invention allows multiple users to share the same files, saving computing resources. When MAKE is ready to link files and create the software system comprised of one or more executable files, MAKE uses the cache links of the present invention (where no new file generation was required), coupled with any new files MAKE has generated (if required).

As described above, the goal of the present invention is to reduce the processing time and resource utilization required by MAKE during the build process. One way to accomplish this goal is to reduce, to the maximum extent possible, the number of object files that MAKE is required to create during the build process. If, in practicing the present invention, the object file handler 230 locates a large percentage of the object file list in the network caches and creates the corresponding links to those cached object files, then MAKE can potentially use those cached copies of the necessary object files, rather than recreating them. Therefore, in general, MAKE's total processing time and resource utilization will be inversely proportional to the number of links the object file handler can create. In other words, the more links the object file handler can create, the less processing time MAKE will require to build a software system.

Practitioners of the present invention will recognize the number of links that can be created by the cache load and link step is maximized when the network caches are periodically maintained and updated. While the present invention automatically loads source files into the source file cache, if they are not already there (block 216, FIG. 6), object files must be periodically added to the object file cache in order to keep the object file cache as current as possible. One skilled in the art can customize the present invention to automatically load object files into the object file cache, after running MAKE. Alternatively, software developers may want the option of manually updating the object file caches, by loading only selected object files, such as those that are particularly useful or that may be repeatedly accessed by others.

To manually insert an object file into the network object file cache, the object file must be renamed from "Filename.o" to "Filenarne.o_abcdefg," where the string of characters "abcdefg" is simply a random sequence of alphanumeric characters. No particular number of characters is required. The purpose of the random sequence of characters appended to the object filename is to insure that each object file has a unique name, so that multiple versions of the same object file can co-exist in the same cache. Next, a check is performed to insure that the newly-created name is not already a filename in the cache. If so, the process is repeated until the filename is different from all other object filenames in the object file cache. The newly-renamed object file is then moved from its current location into the network cache. Its time stamp is preserved in the move to keep MAKE coherent.

As described above, one way to shortcut the examination of object files in the object file cache during the load and link process (block 238 of FIG. 7) is to create and maintain an object identification file for every object file stored in the object file cache. The object identification file has the same filename as the object file stored in the cache, except that a character string that identifies the file as an object identification file (e.g., ".id" or ".ident") is appended to the file name. For example, the identification file name for an identification file corresponding to the example object file described in the preceding paragraphs would be "Filename.o_abcdefg.ident." Each identification file contains only the identification strings that are embedded within the identification file's corresponding object file that identifies the object file's pedigree.

When identification files are used, rather than examining each object file with a matching name to locate and read the identification strings within the file (block 238 of FIG. 7), the present invention checks for an identification file that corresponds to the object file of interest. Since all that an identification file contains is the embedded identification strings from its corresponding object file, the examination process can potentially go much faster. Also, as described above in conjunction with FIG. 7, practitioners may choose to use identification files selectively, for example, only in cases where object files are larger than a certain threshold size.

If practitioners of the present invention opt to include object identification files, the files must be created and cached. While identification files can be created and cached at any time, practitioners of the present invention will probably find that the most convenient time to create and cache identification files is when the network object file caches are updated.

To create an object identification file that corresponds to an object file, after the object file is renamed and cached as described above, the following additional steps are added: (1) create a file with the same name as the object file, adding the suffix selected to be associated with identification files (e.g., ".id," or ".ident"); (2) copy the contents of the identification strings within the corresponding object file to the newly-created object identification file; and (3) load the object identification file into the object file cache.

Rather than manually selecting object files to load into the object file cache, practitioners of the present invention may want to automatically insert all object files from each build into the object file cache. Additionally, practitioners will likely want to archive build lists themselves under a version control system. Maintaining a version control system for build lists and automatically caching object files maximizes efficiency by allowing software developers to avoid duplicative work. For example, designers can avoid having to re-create a build list from the ground up every time a new build is contemplated. Similarly, caching all object files created during a build, along with archiving the build list, insures that when a developer calls up a specific build list, all object files associated with that build list will also be cached. Under this scenario, the present invention creates a maximum number of links during the cache load and link step, thus minimizing the overall system build time.

For these reasons, practitioners of the present invention may want to set up an automatic process for updating the object caches that initiates whenever a new build list is checked into RCS. However, software configuration managers will also likely want some assurance that new build lists and the object files generated from those build lists constitute a worthwhile use of limited computing and memory resources. One way to insure that the objects of new build lists are worthy of caching is to run a set of testing and registering scripts whenever a new build list is checked into RCS.

In a preferred embodiment, the testing and registering script is a persistent process that periodically initiates whenever a new build list is checked in. Once initiated, the script remakes the working directory based upon the build list, recreates the object file list, consisting of explicit object files and potentially usable object files, and creates an executable test bench and a user-specified test suite. Those skilled in the art will recognize that the test suite will consist of a fairly minimal set of tests that are run on the test bench system created by the build list, designed to determine whether archiving the build list and caching the objects it creates are (1) worthy of the memory utilization required and (2) move the overall software development effort in the right direction. If the system passes the tests then each of the object files created by the build can be registered in the object cache. This can be accomplished via a script that performs, for each object file from the object file list, the rename—check—move process described above. If object identification files are being used, those files can be automatically created and loaded into the cache along with the corresponding renamed object files. Upon completion, a database is updated that records each build list and caching/registering job as the latest passing/failing effort. The database can then be used to periodically check whether build lists checked in are truly "new" (i.e., have never been tested and passed/failed). The database also allows developers to identify the latest "passing" build list (i.e., a build list that passed the minimalistic tests required to allow caching of its objects).

Alternatively, practitioners of the present invention may elect to cache all build lists generated by all developers working on a software system, even those that do not pass the minimalistic test suite described above. In this scenario, all build lists—those passing and failing the test suite—are cached, but only the objects generated during builds that pass the test suite are cached. This approach allows software developers to use a failing build list (with the understanding that not all objects from that buildlist have been cached, and therefore some object generation will be required when running MAKE). On the other hand, developers who want to have an executable system file quickly might elect to use the latest passing buildlist, because it would have had all its objects cached, even though the developer may not be working with the most recent version of the entire system.

Finally, depending upon the number of users on the network, the level of complexity of the software system(s) being developed, and the number of different current versions of an object file in existence at any one time, practitioners may find it desirable to pare down the object file cache and/or maintain a "short list" of cached object files. One way to keep the object file cache relatively current is shown in FIG. 9.

Figure 9:
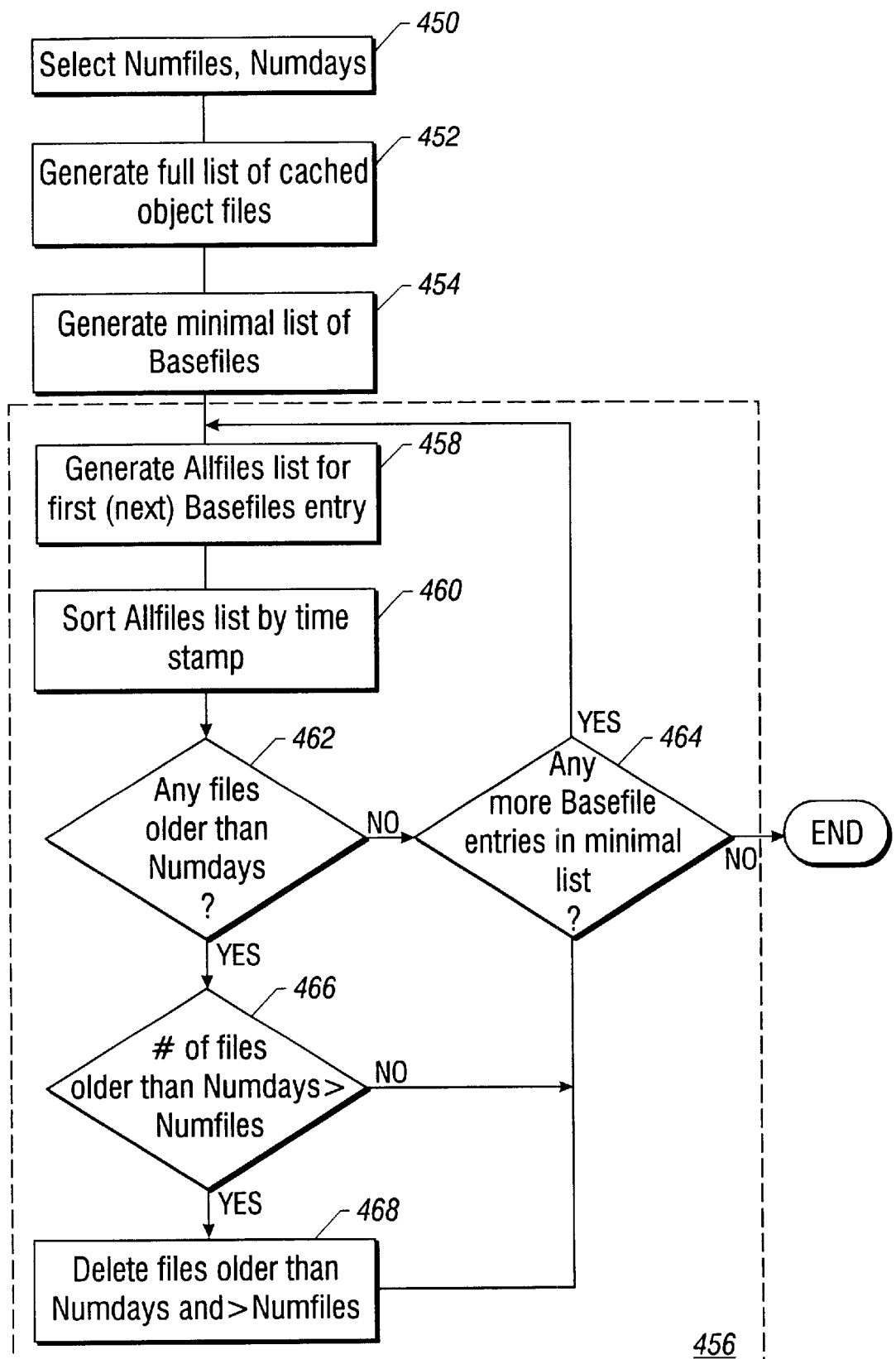
FIG. 9 is a logic flow diagram showing a preferred method for updating the network object cache.

As shown in FIG. 9, the user selects values for the variables "numdays" and "numfiles." "Numdays" is the maximum age, in days, of object files that will be retained in the object file cache. "Numfiles" is the number of files that the user decides should be kept in the object file cache that are older than numdays. As the following discussion demonstrates, the use of the variable "numfiles" insures that object files that are old but still files are not deleted from the object file cache.

The present invention generates a list of all cached object files. From the full list, a minimalistic list of "basefiles" is created. In the context of FIG. 9, a "casefile" is a file's basic file name plus the appropriate set of extensions (i.e., ".o" only, or ".o" and ".cc," if the user wants to include object files generated by Lex from other source files) but excluding the random string of characters appended to the object file name. Therefore, the list of "basefiles" nominally describes the basic object files that are loaded in the cache, but conveys no information regarding either the number of copies of the same basefile, or the number of different versions of the basefile that the cache may contain.

The first time through loop 456, at block 458, the present invention reads the first name from the list of basefiles and generates a list of all object files loaded in the object file cache that contain the basefile name (designated the "allfiles" list). At 460, the allfiles list is sorted by time stamp, most recent first. The present invention then checks, at 462, to see if there are any files on the allfiles list that are older than the age selected by tie user. If there are no files older than "numdays," no files are deleted, and if there are more entries on the basefile list, the system moves, at 464, to the next entry and loop 456 is repeated for the next basefile entry.

On the other hand, if there are files corresponding to the basefile entry that are older than "numdays," the system counts the number of older files. If, at 466, the number of files that are older than numdays exceeds the variable "numfiles," the system deletes files at 468, starting with the oldest file first, until the number of files remaining in the cache that are older than "numdays" equals "numfiles." After the deletion, the number of object files remaining in the object file cache that correspond to the basefiles entry is defined by the expression $$N \leq X + Numfile$$

Where:
  N=total number of cached object files that correspond to the basefiles entry; and
  X=number of cached object files that correspond to the basefiles entry that were generated within the last "numdays" days.

The system then moves to the next basefile entry, and loop 456 repeats until the entire basefile list has been read, the age and number of all files in the object file cache have been checked, and all object files have either been kept or discarded.

Those skilled in the art will recognize that, rather than selecting an integer number of days for the variable "numdays," practitioners of the present invention could select a cutoff date for "numdays" without departing from the present invention. Under this option, files whose time stamps indicate that they were generated before the selected cutoff date are deleted, subject to the operation of the variable "numfiles."

In a system that supports object identification files that are created and cached with object files, whenever object files are deleted from the object file cache in block 468, the corresponding object identification file would also need to be deleted.

In summary, the present invention comprises a method and apparatus for building a software system in a networked software development environment, utilizing existing software version control and build tools such as RCS and MAKE. The present invention creates a cache link structure from a user-created build list, and provides that structure to the software building program. Using those links, the build program then works with the cached copies of the source and object files needed for the build, and builds the program, thus minimizing the amount of recompiling and rebuilding required to complete the build process.

The present invention utilizes a source and object file naming convention and identification scheme to facilitate file identification, cache searching, and link creation. Cached source files are easily identified by their filenames and version numbers. Cached object files are identified by their filename and their "pedigree"—a series of RCS-generated character strings that are embedded within each object file that identify by file name and version number each source file that is a constituent of the object file. The present invention creates a link to a cached object file only when the build list includes every source file and version number that is identified by an object file's identification strings. The present invention also uses a cache search scheme that insures that the newest appropriate object files are always examined for a match to the build list first. The present invention also provides a method to shorten the object file search process by eliminating the need to search through an entire object file to read its identification strings.

Other embodiments of the invention will be apparent to those skilled in the art after considering this specification or after practicing the disclosed invention. The specification and examples above are exemplary only, with the true scope of the invention being indicated by the following claims.

We claim the following invention:

1. A computer software program building apparatus, comprising:

a computer system, said computer system includes a software building computer program, a memory that includes one or more cache memories, one or more time stamped source files stored in said memory, and one or more time stamped object files stored in said cache memory that include one or more identification strings that identify by name and version number all source files that are constituents of said object file;

a build list that identifies source files by name and version number and explicit object files by name, wherein said source files and said explicit object files comprise the software system to be built;

a source file handler, said source file handler generates a cache link structure and an object file list from said build list, wherein said cache link structure comprises links that associate each said source file listed on said build list to a corresponding source file stored in said cache memory wherein each link includes the time stamp of the corresponding source file, and said object file list comprises the names of explicit object files listed on said build list and potentially usable object file names created from said source file names on said build list; and an object file handler that generates links to cached object files corresponding to said explicit object files and said potentially usable object files listed on said object file list, wherein each link includes the time stamp of the corresponding object file, and adds said links to said cache link structure.

2. A computer software program building system, comprising:

a computer system, said computer system includes a software building computer program, a memory that includes one or more cache memories, one or more time stamped source files stored in said memory, and one or more time stamped object files stored in said cache memory that include one or more identification strings that identify by name and version number all source files that are constituents of said object file;

a build list that identifies source files by name and version number and explicit object files by name, wherein said source files and said explicit object files comprise the software system to be built;

a source file handler, said source file handler generates a cache link structure and an object file list from said build list, wherein said cache link structure comprises links that associate each said source file listed on said build list to a corresponding source file stored in said cache memory, wherein each link includes the time stamp of the corresponding source file, and said object file list comprises the names of explicit object files listed on said build list and potentially usable object file names created from said source file names on said build list; and an object file handler that generates links to cached object files corresponding to said explicit object files and said potentially usable object files listed on said object file list, wherein each link includes the time stamp of the corresponding object file, and adds said links to said cache link structure.

3. A method that makes a computer software program building apparatus, comprising:

providing a computer system, said computer system includes a software building computer program, a memory that includes one or more cache memories, one or more time stamped source files stored in said memory, and one or more time stamped object files stored in said cache memory that include one or more identification strings that identify by name and version number all source files that are constituents of said object file;

providing a build list that identifies source files by name and version number and explicit object files by name, wherein said source files and said explicit object files comprise the software system to be built;

providing a source file handler, said source file handler generates a cache link structure and an object file list from said build list, wherein said cache link structure comprises links that associate each said source file listed on said build list to a corresponding source file stored in said cache memory, wherein each link includes the time stamp of the corresponding source file, and said object file list comprises the names of explicit object files listed on said build list and potentially usable object file names created from said source file names on said build list; and providing an object file handler that generates links to cached object files corresponding to said explicit object files and said potentially usable object files listed on said object file list, wherein each link includes the time stamp of the corresponding object file, and adds said links to said cache link structure.

4. A method that uses a computer software program building apparatus, comprising:

providing a computer system, said computer system includes a software building computer program, a memory that includes one or more cache memories, one or more time stamped source files stored in said memory, and one or more time stamped object files stored in said cache memory that include one or more identification strings that identify by name and version number all source files that are constituents of said object file;

creating a build list that identifies source files by name and version number and explicit object files by name, wherein said source files and said explicit object files comprise the software system to be built;

generating a cache link structure and an object file list from said build list using a source file handler, wherein said cache link structure comprises links that associate each said source file listed on said build list to a corresponding source file stored in said cache memory, wherein each link includes the time stamp of the corresponding source file, and said object file list comprises the names of explicit object files listed on said build list and potentially usable object file names created from said source file names on said build list;

generating one or more links to cached object files corresponding to said explicit object files and said potentially usable object files listed on said object file list using an object file handler, wherein each link includes the time stamp of the corresponding object file, said object file handler also adds said links to said cache link structure; and providing said cache link structure to said software building program.

5. A program storage device readable by a computer system that tangibly embodies a program of instructions executable by the computer system to perform a method that uses a computer software program building apparatus, said method comprising:

providing a computer system, said computer system includes a software building computer program, a memory that includes one or more cache memories, one or more time stamped source files stored in said memory, and one or more time stamped object files stored in said cache memory that include one or more identification strings that identify by name and version number all source files that are constituents of said object file;

creating a build list that identifies source files by name and version number and explicit object files by name, wherein said source files and said explicit object files comprise the software system to be built;

generating a cache link structure and an object file list from said build list using a source file handler, wherein said cache link structure comprises links that associate each said source file listed on said build list to a corresponding source file stored in said cache memory, wherein each link includes the time stamp of the corresponding source file, and said object file list comprises the names of explicit object files listed on said build list and potentially usable object file names created from said source file names on said build list;

generating one or more links to cached object files corresponding to said explicit object files and said potentially usable object files listed on said object file list using an object file handler, wherein each link includes the time stamp of the corresponding object file, said object file handler also adds said links to said cache link structure; and providing said cache link structure to said software building program.

6. A dependent claim according to claim 1, 2, 3, 4, or 5 wherein said object file handler generates said links to said object files corresponding to said explicit object files when the name of said object file corresponds at least in part to the name of said explicit object file.

7. A dependent claim according to claim 1, 2, 3, 4, or 5 wherein said object file handler generates said links to said object files corresponding to said potentially usable object files when the name of said object file corresponds at least in part to the name of said potentially usable object file and said identification strings included in said object file identifies by name and version number only source files that are listed on said build list.

8. A dependent claim according to claim 1, 2, 3, 4, or 5, wherein said build list further comprises directory and path information that the computer software program to be built will include, and said cache link structure further comprises a directory structure that the computer software program to be built will include.

9. A dependent claim according to claim 1, 2, 3, 4, or 5, wherein said links to cached object files are created by:

checking for the existence of an identification file that corresponds to an object file stored in said cache memory whose name corresponds in part to said object file listed on said object file list, said identification file further comprises said one or more identification strings from its said corresponding object file; and reading said identification string from said identification file if said identification file exists, otherwise, reading said identification string from said object file stored in said cache memory whose name corresponds in part to said object file listed on said object file list.

* * * * *